March 31, 1970  E. RENZ ET AL  3,503,469

BEARING LUBRICATING ARRANGEMENT

Filed June 13, 1968

INVENTORS:
Eugen Renz
Helmut Widder
Hubert Rothert

BY Spencer & Kaye
Attorneys

United States Patent Office 3,503,469
Patented Mar. 31, 1970

3,503,469
BEARING LUBRICATING ARRANGEMENT
Eugen Renz, Mulheim, Helmut Widder, Essen, and Hubert Rothert, Berlin, Germany, assignors to Licentia Patent-Verwaltungs-G.m.b.H., Frankfurt am Main, Germany
Filed June 13, 1968, Ser. No. 736,610
Claims priority, application Germany, June 19, 1967, L 56,765
Int. Cl. F16n 1/00
U.S. Cl. 184—5          6 Claims

ABSTRACT OF THE DISCLOSURE

An arrangement for lubricating a bearing of a high-speed oil-cooled rotary machine, such as a generator. The arrangement includes a rotor shaft having a cavity for holding cooling oil and at least one oil outlet that communicates with the cavity; a bearing, spaced from the outlet, rotatably supporting the shaft; a stator having a portion spaced from the outlet which, together with the shaft, forms a space into which the outlet opens and a sealing unit arranged in and sealing the space. The sealing unit includes a rotary ring which is rotatable with the shaft and a stationary ring arranged in sealing engagement with the rotary ring but inherently allowing the flow of leakage oil between itself and the rotary ring. Means are also provided for conducting the major portion of the oil out of the space and for conducting the remainder, which leaks between the two rings, to the bearing.

BACKGROUND OF THE INVENTION

The present invention relates to apparatus for lubricating the bearings of high-speed oil-cooled generators.

To increase the efficiency of high-speed generators of the type which are used to generate power in aircraft and motor vehicles, it has recently become the practice to cool both the rotors and stators thereof by means of a liquid cooling medium, such as oil. The oil channels of a generator are usually designed so that the cooling oil must flow through the following path:

The cooling oil is introduced from a feeding chamber into a tube within the hollow rotor shaft at the end of the shaft which opposes the driven end. The cooling oil then flows through and emerges from the tube at the driven end of the shaft and is turned back to flow in the opposite direction inside the rotor shaft but outside the tube. From the rotor shaft the cooling oil is directed to flow to the bearing plate, pass through the stator housing jacket and return to the feeding chamber.

Grooved ball bearings are generally employed to hold the shaft of high-speed generators. The cooling oil which is directed through the bearing simultaneously serves, therefore, to lubricate the bearing. To seal the points at which the cooling oil passes from the rotor into the bearing plate and bearing, a slide ring packing is normally arranged on both sides of the bearing. The packing is made of two radially extending annular surfaces that are pressed together by the force of a spring.

In spite of the spring force that presses the annular surfaces of the side rings together it is impossible to prevent oil from leaking, drop by drop, through the gap between the ring surfaces. If the leakage oil losses are accepted, however, the slide ring which rotates with the shaft and the stationary slide ring do insure an adequate seal.

At high rotational speeds of the rotor, the cooling oil which is tapped from the rotor shaft and directed through the bearing experiences a sharp increase in rotational speed as it passes through the bearing. This acceleration of the oil acts to generate a heat in the bearing which is considerably greater than the quantity of heat that the cooling oil is able to remove.

The prior art arrangement for cooling and lubricating the bearings of a high-speed generator also has the disadvantage of requiring the use of purified cooling oil. This is because the presence of foreign bodies in the oil would reduce the useful life of the bearings.

SUMMARY OF THE INVENTION

An object of the present invention, therefore, is to design apparatus for lubricating the bearings of oil-cooled generators having high-speed rotors, which apparatus avoids the disadvantages of the prior art noted above.

This, as well as other objects which will become apparent in the discussion that follows, is achieved, according to the present invention, by spacing the slide ring packing apart from the bearing so that the major portion of the cooling oil will be led past the bearing. Only the fraction of the oil which leaks through the gap between the slide ring that rotates with the rotor shaft and the stationary counter ring is then supplied to the bearing for lubrication.

Not only does the arrangement according to the present invention minimize the heat generated by the oil in the bearing, since only small amounts of the cooling oil are actually used for lubrication purposes, but the use of the ring packing to "filter" the oil fed to the bearing also makes the purification of the cooling oil unnecessary.

DESCRIPTION OF THE PREFERRED EMBODIMENTS

Figure 1:
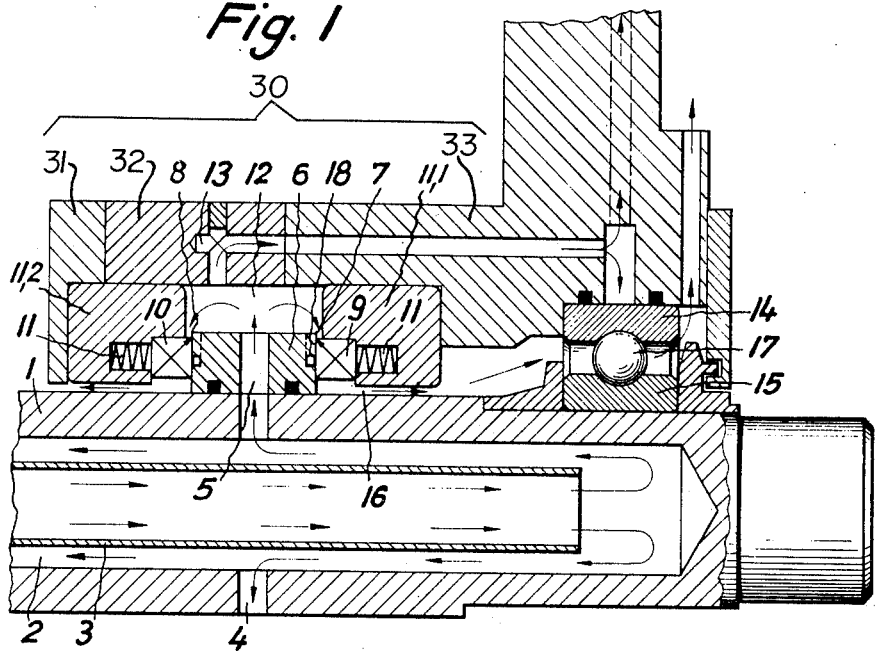
FIGURE 1 is a cross-sectional view of a bearing arrangement on a rotor shaft of an oil-cooled generator according to one preferred embodiment of the present invention. In this embodiment the leakage oil which is used to lubricate the bearing is fed directly to the bearing.

Referring now to the drawings, FIGURE 1 shows the hollow shaft 1 of a generator rotor having a tube 3 projecting through the cavity 2 in the rotor shaft to a point near the shaft end. The hollow shaft 1 is provided with radial openings 4 which extend into holes 5 in a slide ring packing 6 that is arranged to rotate with the shaft 1. A stator means 30 including axially aligned members 31, 32 and 33 surrounds the shaft and has inner surface portions which are radially spaced from the outer surface portions of the rotor shaft to form an annular space surrounding the shaft. Stator portion 32 is in alignment with the oil outlet holes 5. Stator portions 31 and 33, which are on opposite sides of stator portion 32 hold counter rings 9 and 10 which are pressed by the force of the springs 11 against the side surfaces 7 and 8 of the slide ring 6. The force of the springs 11 acting on the counter rings 9 and 10 is sufficiently weak to insure that the slide ring 6 can rotate. Cooling channels 13 are formed in stator portions 32 and 33 and are arranged to start at the ring space 12 above the slide ring 6, pass the stationary bearing member 14 and lead to the stator housing (not shown). A ring channel 16 is located between the slide ring 6 and the bearing member 15 which rotates with the shaft 1. This channel 16 opens into the ball bearing 17.

Oil which is suitable both for cooling and lubricating is maintained in the tube 3 under pressure. As shown by the arrows, when the shaft 1 rotates, it flows toward the right inside the tube 3 to the open end of this tube where it emerges and changes direction. The oil then flows back outside tube 3 but within the hollow shaft 1. This flow of the oil already provides sufficient cooling for the shaft 1 and the bearing member 15 both of which are heated as a result of the rotation.

A portion of the cooling oil in the hollow shaft 1 is then pressed through the openings 4 and the holes 5 into the ring space 12 as a result of centrifugal force. From there it is directed through the cooling channels 13 into the stator housing (not illustrated in the drawing). As the slide ring 6 rotates, a small portion of the cooling oil present in the ring space 12 passes as leakage oil through the gap 18 formed between the slide ring 6 and the counter ring 9. This leakage oil enters the ring channel 16 and is passed directly to the roller bearing 17 where it acts as a lubricant. The leakage oil finally exits from the lubricated bearing 17 on the side opposite the ring channel 16 and drains away through a leakage oil line (not shown).

Figure 2:
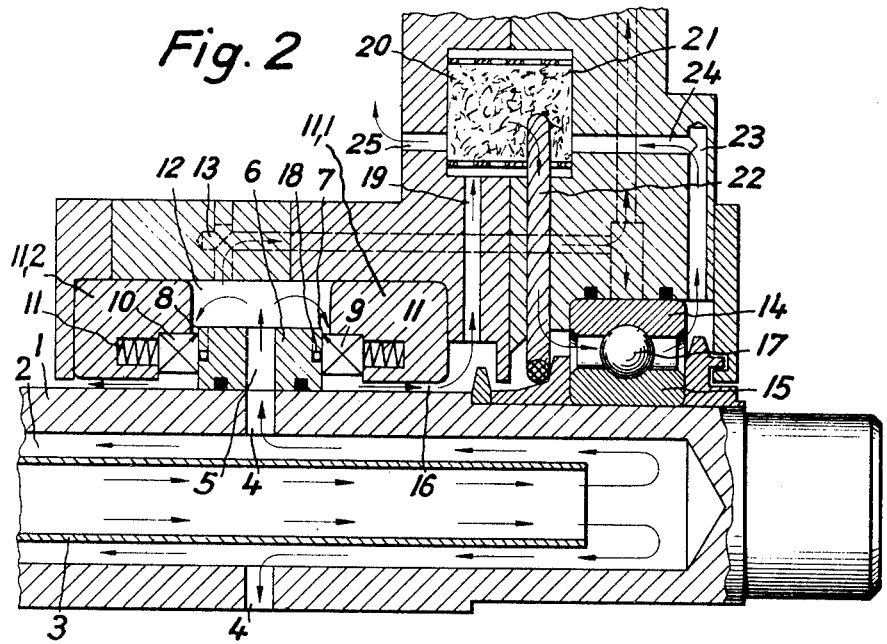
FIGURE 2 is a cross-sectional view of a bearing arrangement on a rotor shaft of an oil-cooled generator according to another preferred embodiment of the present invention. In this embodiment the leakage oil is fed to the bearing via a storage chamber containing absorbent material.

FIGURE 2 shows another embodiment of the lubricating arrangement according to the present invention; this arrangement insures that uniform quantities of leakage oil will be supplied to lubricate the bearing 17. The elements shown in this figure which are identical to the elements shown in FIGURE 1 are designated with the same reference numerals that appear in FIGURE 1. In this arrangement, after the leakage oil has passed through the gap 18 and the ring channel 16 it is diverted through a channel 19 into a storage chamber 21 which is filled with an absorbent material 20 such as cotton wadding. From there the oil is supplied to the bearing 17 by a wick 22. After the oil has passed through the bearing 17 it is conveyed through channels 23 and 24 back into the storage chamber 21 where it is again absorbed by the wadding 20 and the wick 22. An opening 25 in the storage chamber 21 permits the excess oil to drain off into a leakage oil container (not shown) to prevent the oversaturation of the wadding 20.

The lubricating arrangement according to the present invention has the advantage that it employs only the oil which leaks by the slide ring packing to lubricate the bearings. This prevents the lubricating oil from generating excess heat. This lubricating arrangement also has the advantage that it prevents any impurities in the cooling oil from reaching the bearings. This advantage is due to the fact that the gap in the slide ring packing is smaller than the foreign bodies contained in the oil. In effect, therefore, the slide ring packing operates as a self-cleaning filter.

It will be understood that the above description of the present invention is susceptible to various modifications, changes and adaptations, and the same are intended to be comprehended within the meaning and range of equivalents of the appended claims.

What is claimed is:
1. An arrangement for lubricating the bearing of a high-speed oil-cooled rotary machine comprising, in combination:
   (a) a rotor shaft having a cavity for holding cooling oil and at least one oil outlet communcating with said cavity and opening at the circumferential surface of said shaft;
   (b) bearing means rotatably supporting said shaft and axially spaced from said outlet;
   (c) stator means surrounding said shaft and having a portion in axial alignment with said oil outlet, the inner surface of said stator portion and the outer surface of said rotor shaft being radially spaced from each other and forming an annular space between themselves;
   (d) sealing means arranged in said annular space and including a rotary ring which is rotatable with said shaft and a stationary ring, said rings being in sealing engagement with each other for sealing said annular space but inherently allowing the flow of leakage oil between themselves;
   (e) means in communication with said annular space for conducting away a part of the oil in said space;
   (f) means for conducting the remainder of the oil in said annular space and which leaks between said two rings to said bearing means; and
   (g) means for conducting oil away from said bearing means.

2. The arrangement defined in claim 1, wherein said means for conducting the remainder of the oil to the bearing means includes a channel arranged to receive the oil that leaks between said two rings, an oil storage chamber filled with absorbent material connected to said channel, and a wick connected to said storage chamber for conducting oil from said storage chamber to said bearing means.

3. The arrangement defined in claim 2, wherein said absorbent material is cotton.

4. The arrangement defined in claim 2, wherein said means for conducting oil away from said bearing means includes an additional channel arranged to receive the oil from said bearing means, said additional channel being connected to conduct oil back to said storage chamber.

5. The arrangement defined in claim 2, wherein said storage chamber includes means for conducting excess oil away therefrom.

6. An arrangement for lubricating the bearing of a high-speed oil-cooled rotary machine, comprising, in combination:
   (a) a rotor shaft having a cavity for holding cooling oil and at least one oil outlet communicating with said cavity;
   (b) bearing means rotatably supporting said shaft and spaced from said outlet;
   (c) stator means having a portion spaced from said outlet and, together with said shaft, forming a space into which said outlet opens;
   (d) sealing means arranged in said space and including a rotary ring which is rotatable with said shaft and a stationary ring, said rings being in sealing engagement with each other for sealing said space but inherently allowing the flow of leakage oil between themselves;
   (e) means communicating with said space for conducting away a part of the oil in said space;
   (f) means for conducting the remainder of the oil in said space and which leaks between said two rings to said bearing means; and
   (g) means for conducting oil away from said bearing means.

References Cited

UNITED STATES PATENTS

| | | | |
|---|---|---|---|
| 2,085,814 | 7/1937 | Matthews et al. | 184—6 |
| 2,135,477 | 11/1938 | Griswold | 184—6 |
| 2,183,485 | 12/1939 | Butzbach et al. | 184—6 |
| 2,403,579 | 7/1946 | Carpenter | 184—6 |
| 2,408,336 | 9/1946 | Orr | 184—6 |
| 3,053,115 | 11/1962 | Cartwright et al. | 74—730 |
| 3,131,582 | 5/1964 | Kelbel | 74—730 XR |

FOREIGN PATENTS 1,004,278  11/1951  France.

FRED C. MATTERN, Jr., Primary Examiner

MANUEL ANTONAKAS, Assistant Examiner

U.S. Cl. X.R.

184—6